US009014125B2

(12) United States Patent
Hietalahti et al.

(10) Patent No.: US 9,014,125 B2
(45) Date of Patent: *Apr. 21, 2015

(54) CIRCUIT SWITCHED DOMAIN CODEC LIST FOR SINGLE RADIO VOICE CALL CONTINUITY

(71) Applicant: Nokia Corporation, Espoo (FI)

(72) Inventors: Hannu Hietalahti, Kiviniemi (FI); Curt Wong, Sammamish, WA (US)

(73) Assignee: Nokia Technologies Oy, Espoo (FI)

( * ) Notice: Subject to any disclaimer, the term of this patent is extended or adjusted under 35 U.S.C. 154(b) by 36 days.

This patent is subject to a terminal disclaimer.

(21) Appl. No.: 14/080,996

(22) Filed: Nov. 15, 2013

(65) Prior Publication Data

US 2014/0071924 A1    Mar. 13, 2014

Related U.S. Application Data

(63) Continuation of application No. 12/990,764, filed on Nov. 2, 2010, now Pat. No. 8,619,761.

(51) Int. Cl.
| | | |
|---|---|---|
| *H04L 5/00* | (2006.01) | |
| *H04L 12/66* | (2006.01) | |
| *H04W 36/00* | (2009.01) | |
| *H04L 29/06* | (2006.01) | |

(52) U.S. Cl.
CPC ........... *H04L 5/0044* (2013.01); *H04L 65/1069* (2013.01); *H04L 12/66* (2013.01); *H04W 36/0022* (2013.01)

(58) Field of Classification Search
CPC ..... H04L 65/1069; H04L 12/66; H04L 47/10; H04L 47/11; H04L 47/125
See application file for complete search history.

(56) References Cited

U.S. PATENT DOCUMENTS

| | | | |
|---|---|---|---|
| 7,065,069 | B1 | 6/2006 | Echols |
| 2002/0142749 | A1 | 10/2002 | Muniere et al. |
| 2004/0076145 | A1 | 4/2004 | Kauhanen et al. |
| 2005/0190716 | A1 | 9/2005 | Buckley et al. |
| 2006/0211425 | A1 | 9/2006 | Bae et al. |
| 2006/0264217 | A1 | 11/2006 | Shaheen |

(Continued)

FOREIGN PATENT DOCUMENTS

| | | |
|---|---|---|
| CN | 101052161 A | 10/2007 |
| CN | 101137095 A | 3/2008 |

(Continued)

OTHER PUBLICATIONS

Chinese Office Action application No. 200980115814.7 dated Feb. 7, 2014.

(Continued)

*Primary Examiner* — Raj Jain
(74) *Attorney, Agent, or Firm* — Squire Patton Boggs (US) LLP

(57) ABSTRACT

A Circuit Switched (CS) domain codec list for Single Radio Voice Call Continuity (SR-VCC) is provided. A apparatus providing such a list can include preparing a list of include preparing a list of circuit switched capabilities of a terminal device, sending the list to a network device during attachment, receiving the list at the network device, storing the list in the network device, sending the list to a second network device, receiving the list at the second network device, and using the list in handing over the terminal device to the second network device.

15 Claims, 4 Drawing Sheets

(56) References Cited

U.S. PATENT DOCUMENTS

| | | |
|---|---|---|
| 2007/0104114 A1 | 5/2007 | Chu et al. |
| 2007/0171841 A1 | 7/2007 | Witzel et al. |
| 2008/0020702 A1 | 1/2008 | Jendbro et al. |
| 2008/0181178 A1 | 7/2008 | Shaheen |
| 2010/0329150 A1 | 12/2010 | Nielsen |

FOREIGN PATENT DOCUMENTS

| | | |
|---|---|---|
| WO | 2007/098783 A1 | 9/2007 |
| WO | 2008/023162 A2 | 2/2008 |

OTHER PUBLICATIONS

International Search Report and Written Opinion of the International Searching Authority for corresponding Patent Cooperation Treaty Application No. PCT/IB2009/005460 dated Oct. 1, 2009, 12 pages.

Office Action dated Jan. 30, 2013, for corresponding Chinese Patent Application No. 200980115814.7.

Chinese Office Action dated Sep. 6, 2013, issued in corresponding CN Patent Application No. 200980115814.7.

Anders Roos et al., "Critical Issues for Roaming in 3G", 3G Mobile Network Technologies and Experiences, Feb. 2003, pp. 1-7.

ETSI TS 123 153 v5.0.0, Universal Mobile Telecommunications System (UMTS); Out of Band Transcoder Control; Stage 2; (3GPP TS 23.153 Version 5.0.0 Release 5), Mar. 2002, pp. 1-46.

CIRCUIT SWITCHED DOMAIN CODEC LIST FOR SINGLE RADIO VOICE CALL CONTINUITY

CROSS REFERENCE TO RELATED APPLICATIONS

This application is a continuation of U.S. application Ser. No. 12/990,764, filed Nov. 2, 2010, which is a National Stage of International Application No. PCT/IB2009/005460, filed May 1, 2009, which claims priority from U.S. Provisional Application No. 61/071,513, filed May 2, 2008. The contents of these applications are hereby incorporated by reference in their entirety.

BACKGROUND OF THE INVENTION

The present invention generally relates to communications, for example, wireless communications. More specifically, certain embodiments of the present invention relate to providing a Circuit Switched (CS) domain codec list for Single Radio Voice Call Continuity (SR-VCC).

The Third Generation Partnership Project (3GPP) is working on Single Radio Voice Call Continuity (SR-VCC) procedures in Revision Eight (R8). SR-VCC has been discussed, for example, in TR 23.882 and is expected to be discussed in TS 23.216. SR-VCC can enable a User Equipment (UE) to perform an inter-domain handover from Long Term Evolution (LTE) to Circuit-Switched (CS), for both the Code Division Multiple Access (CDMA) and the Global System for Mobile Communication (GSM) CS network.

In 3GPP Release Seven (R7) Voice Call Continuity (VCC), the inter-domain handover is performed by UE, i.e., by establishing parallel connection to both accesses (Internet Protocol (IP) Multimedia Subsystem (IMS) and CS domain). In SRVCC, 3GPP TS 23.216, the inter-domain handover solution is performed by an enhanced Mobile Switching Center (MSC) (i.e., MSC enhanced for SRVCC) on behalf of the UE. The UE gets only a relocation command over the radio access and jumps to the CS domain immediately.

BRIEF DESCRIPTION OF THE DRAWINGS

For proper understanding of the invention, reference should be made to the accompanying drawings, wherein.

DETAILED DESCRIPTION

Figure 1:
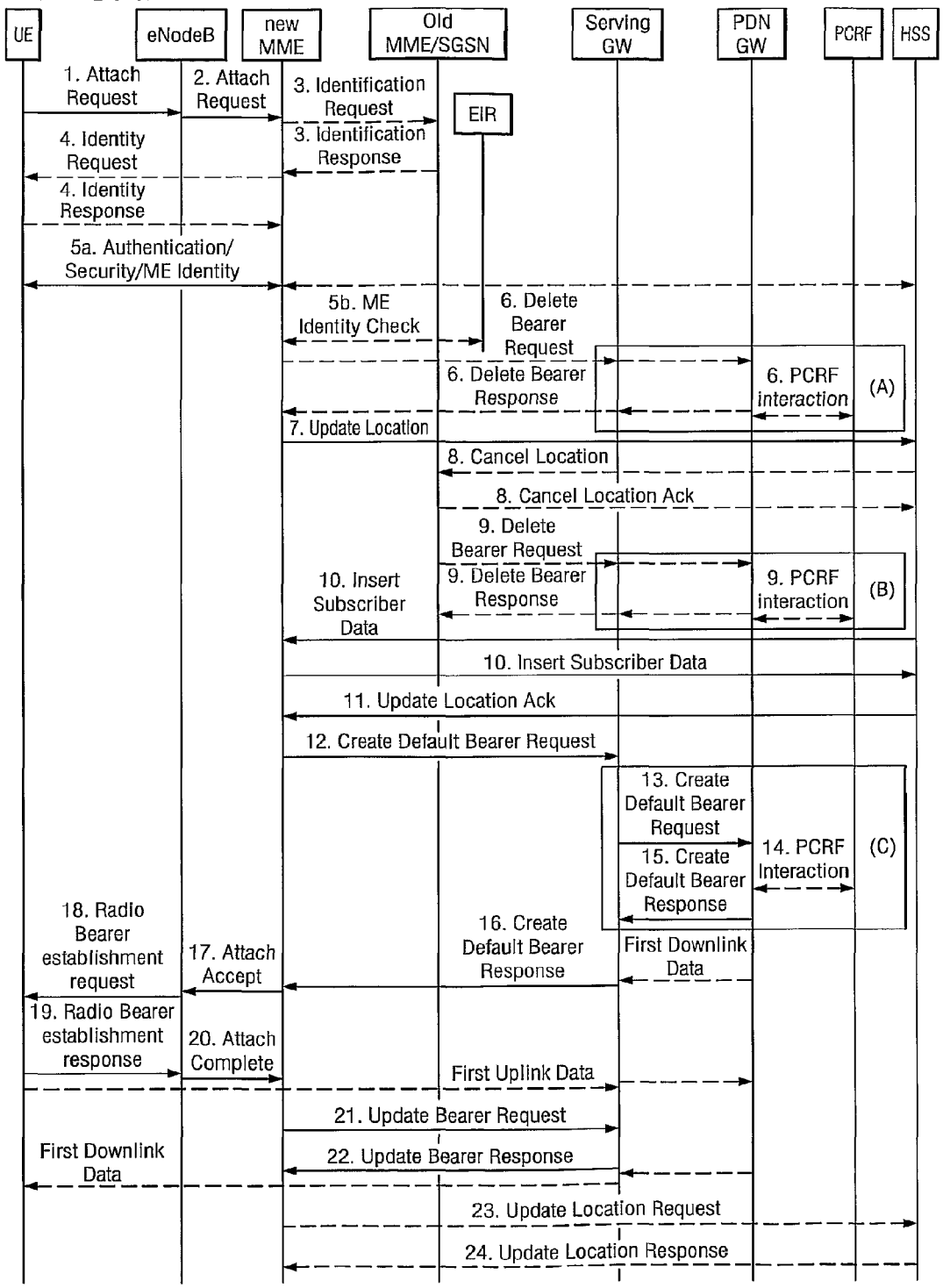
FIG. 1 illustrates an LTE attachment procedure.

In Release Seven (R7) Voice Call Continuity (VCC), the User Equipment (UE) can negotiate the Circuit Switched (CS) codec directly with the CS domain via the procedure defined for setting up the bearer in TS 24.008 (in Bearer capability IE/10.5.4.5/ and in Supported codec list IE/10.5.4.32/). This may not be possible in Single Radio VCC (SRVCC) because the UE may not be involved on the SRVCC preparation. The list of codec(s) that are supported by the UE needs to be known by the enhanced Mobile Switching Center (MSC) in order for the handover procedure with the target cell properly. A challenge is how the enhanced MSC is supposed to get the supported codec from the UE.

One way that this challenge can be addressed is by the speech codec(s) supported by the UE being given in TS 24.008 capability Information Element (IE) (section 10.5.4.5) and in supported codec list IE (section 10.5.4.32). Bearer capability IE defines code points for each codec that can be expressed in that IE, while supported codec list IE just allocates some space for a list of codecs that are defined via reference to 26.103. So, whenever 26.103 adds a new codec, it can be automatically inherited by 24.008 also.

Since this is related to UE capabilities, it may be helpful for SRVCC UE (e.g., the LTE UE that supports SRVCC functionality) to send the supported CS codec list information during LTE attachment.

So when SRVCC is triggered, the Mobility Management Entity (MME) can send this information, along with any other information that is needed for the SRVCC, to the enhanced MSC. As a result, the enhanced MSC can have the supported codec information to setup the handover signaling with the target Second Generation/Third Generation (2G/3G) radio access network and for the target MSC to be aware of the codec capabilities of the UE.

In Evolved Packet Core (EPC) (TS 23.401), it can be defined that the UE sends its capabilities to the MME during LTE attachment. The bearer capability IE can be sent to the MME as part of this procedure. Therefore, the solution can be straightforward and the enhanced MSC can have the information needed for SRVCC procedure.

One very straightforward way to implement this would be to include the Supported Codecs List and/or Bearer Capability or parts of those IEs in the attach procedure. Alternative implementation would be some other mechanism, such as a bit map, to indicate, during the attach, which codecs are supported by the mobile station in the CS domain.

All conventional 3GPP radios up to now (GSM Enhanced Data rates for Global Evolution (EDGE) Radio Access Network (GERAN), Universal Mobile Telecommunication System (UMTS) Terrestrial Radio Access Network (UTRAN), and High-Speed Packet Access (HSPA)) offered Packet-Switched (PS) domain capability, but they also offered the possibility for CS domain traffic, and hence all voice calls using such conventional radios can be started in CS domain without needing embodiments of the present invention.

Wireless Local Area Network (WLAN) Access Points (APs) are typically not coordinated by the cellular network operator, so various embodiments of the present invention may not be needed in such cases.

But with LTE or with any cellular network operator coordinated PS only access technology, such as Worldwide Interoperability for Microwave Access (WiMAX), the invention becomes an essential part of the speech call mobility between the PS part and CS part of the operator's network.

Handover between coordinated or un-coordinated radio networks can provide mobile connectivity to the mobile station, but that alone may be of little use for keeping the speech calls in PS-CS handover or transfer case, since the call control layers of CS and PS domain are inherently different (CS Call Control protocol vs. Voice over IP (VoIP) session control protocol, such as Session Initiation Protocol (SIP)).

So as soon as an existing cellular operator opens up a PS-only network of any kind, they may experience a speech call mobility challenge between CS and PS parts of the network. Certain embodiments of the present invention may address such challenges.

For example, in certain embodiments, the SRVCC UE (e.g., the LTE UE that supports SRVCC functionality) can send the supported CS codec list information during LTE attachment. Thus, when SRVCC is triggered, the MME can send this information along with any other information that is needed for SRVCC to the enhanced MSC. As a result, the enhanced MSC can have the supported codec information to setup the handover signaling with the target 2G/3G radio access network The following describes a first step of an LTE attachment procedure, as shown in FIG. 1. The UE initiates the Attach procedure by the transmission of an Attach Request (International Mobile Subscriber Identity (IMSI) or old Globally Unique Transaction Identifier (GUTI), last visited Target Attachment Identifier (TAI) (if available), UE Network Capability, Packet Data Network (PDN) Address Allocation, Protocol Configuration Options, Attach Type) message together with an indication of the Selected Network to the eNodeB. The IMSI can be included if the UE does not have a valid GUTI available. If the UE has a valid GUTI, it can be included. If available, the last visited TAI can be included in order to help the MME produce a good list of TAIs for any subsequent Attach Accept message. The "Selected Network" can indicate the Public Land Mobile Network (PLMN) that is selected for network sharing purposes. The UE Network Capability is described as "UE capabilities." If a Network Access Stratum (NAS) security association between the UE and the MME already exists, the Attach Request message can be integrity protected in order to allow validation of the UE by the MME.

It may be that the Attach Request message, or any individual information elements included in it, may also be encrypted to ensure its confidentiality. The "PDN Address Allocation" can indicate whether the UE wants to perform the IP address allocation during the attach procedure and, when known, it can indicate the UE IP version capability (IPv4, IPv4/IPv6, IPv6), which is the capability of the IP stack associated with the UE. Protocol Configuration Options (PCO) can be used to transfer parameters between the UE and the PDN GW, and can be sent transparently through the MME and the Serving GW. "Attach Type" can indicate "Handover" when the UE has already an activated PDN GW/HA due to mobility with non-3GPP accesses.

This LTE attachment procedure can be expanded by having the UE provide CS codec information, which then can be stored in the MME.

Figure 2:
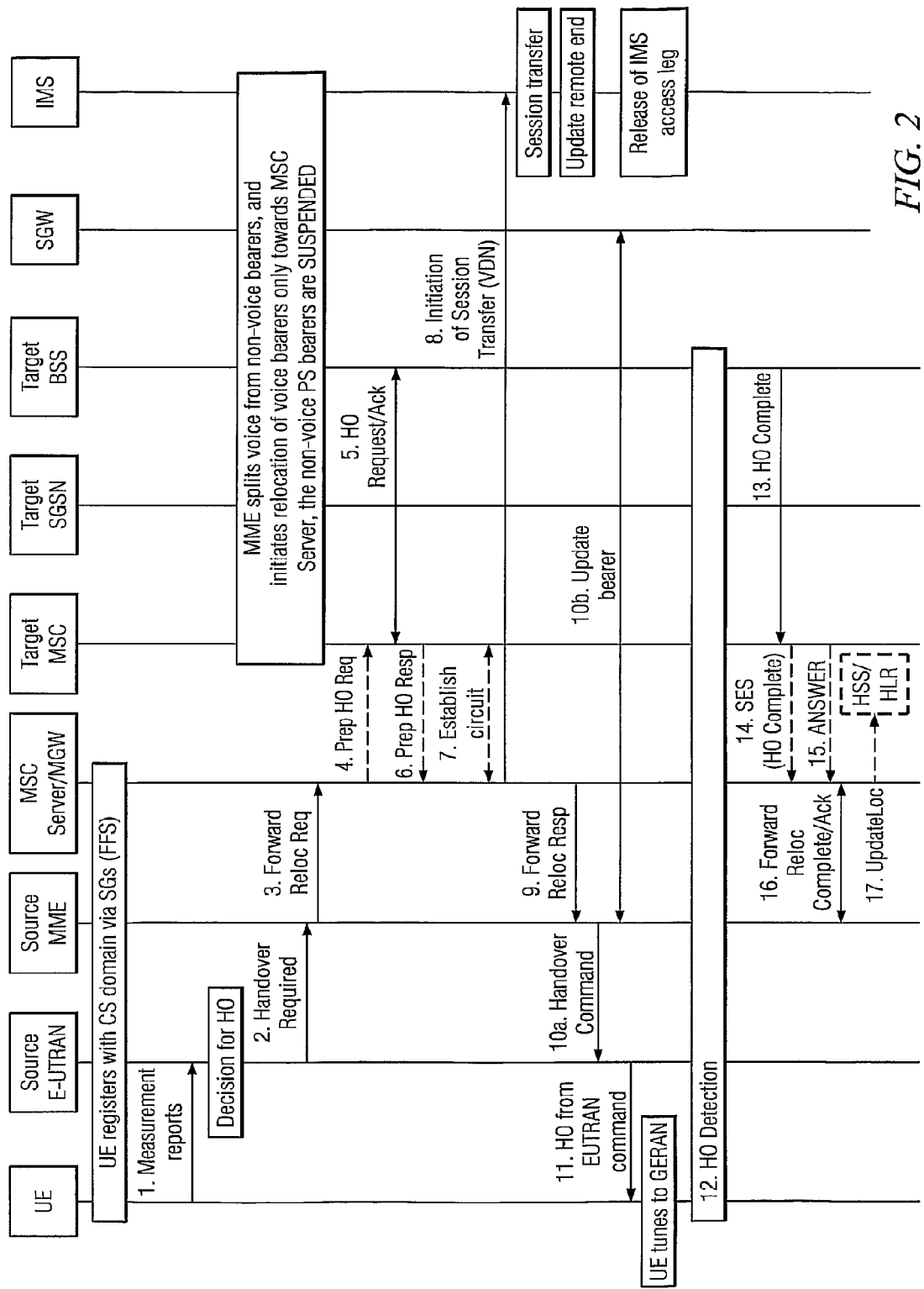
FIG. 2 illustrates LTE handover procedures without DTM/PSHO support.
Figure 3:
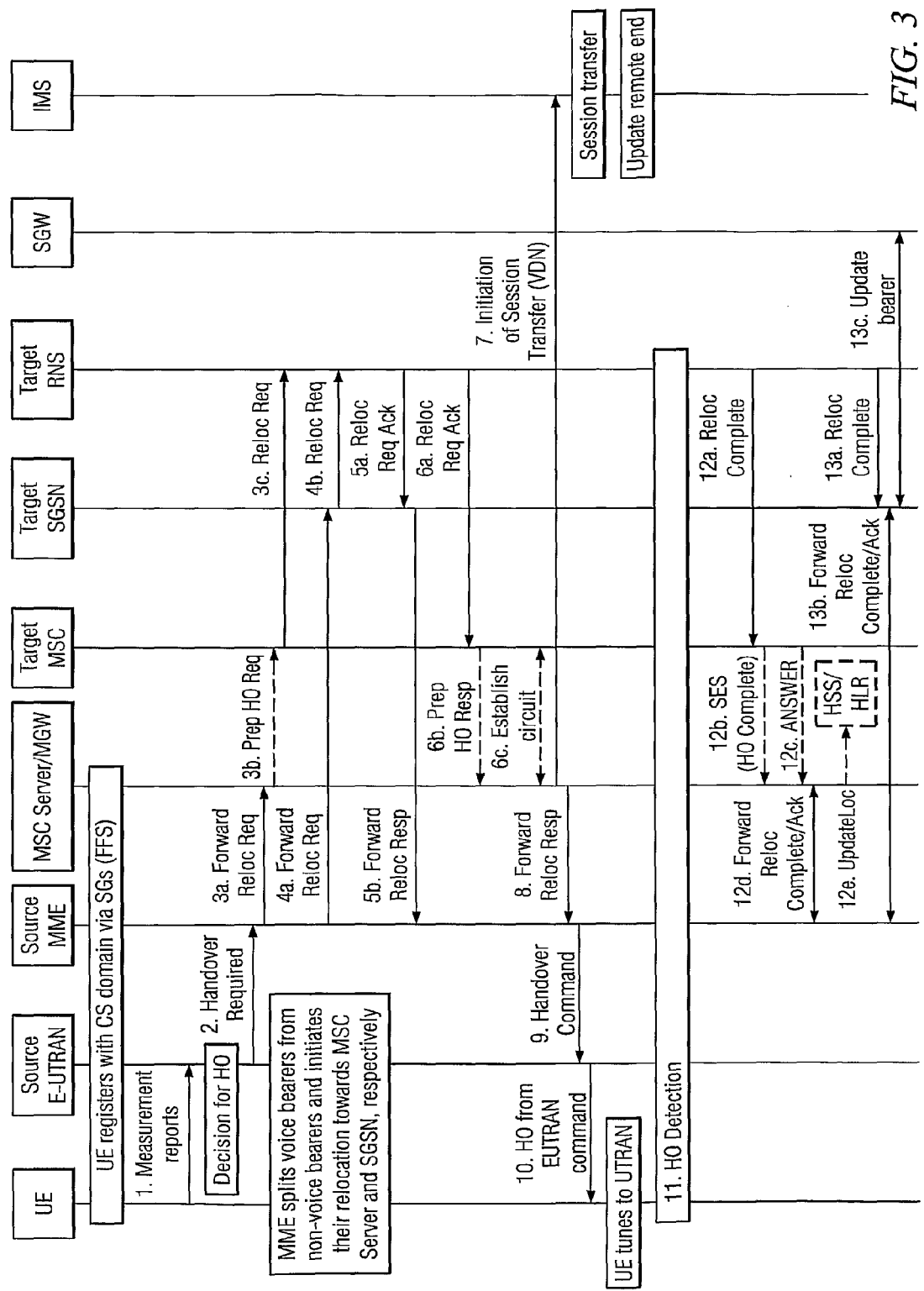
FIG. 3 illustrates LTE handover procedures with DTM/PSHO support.

FIGS. 2 and 3 illustrate LTE handover procedures, respectively without and with DTM/PSHO support.

As illustrated in FIG. 2, at step 3, based on the Quality of Service (QoS) Class Identifier (QCI) associated with the voice bearer (QCI 1) the source MME splits the voice bearer from the non-voice bearers and initiates the PS handover procedure for the voice bearer by sending a Forward Relocation Request (Vector Directory Number (VDN), Mobile Subscriber Integrated Services Digital Network (MSISDN), Source to Target Transparent Container, Mobility Management (MM) Context) message to the MSC Server. It is assumed that the MME has received VDN and MSISDN from the Home Subscriber Server (HSS) as part of the subscription profile downloaded during the E-UTRAN attach procedure. MM Context contains security related information.

As illustrated in FIG. 3, at step 3, based on the QCI associated with the voice bearer (QCI 1) the source MME splits the voice bearer from all other PS bearers. The following steps are performed. First, a source MME initiates the PS handover procedure for the voice bearer by sending a Forward Relocation Request (VDN, MSISDN, Source to Target Transparent Container, MM Context) message to the MSC Server. The message includes information for the voice component only. It is assumed that the MME has received VDN and MSISDN from the HSS as part of the subscription profile downloaded during the E-UTRAN attach procedure. MM Context contains security related information. Second, the MSC Server interworks the PS handover request with a CS inter-MSC handover request by sending a Prepare Handover Request message to the target MSC. The CS Security key is derived from the E-UTRAN/EPS domain key contained in the MM Context. Third, the target MSC requests resource allocation for the CS relocation by sending the Relocation Request (Source to Target Transparent Container) message to the target RNS.

The above-discussed steps of FIGS. 2 and 3 can likewise be expanded by including CS codec information in the message between MME and MSC.

Figure 4:
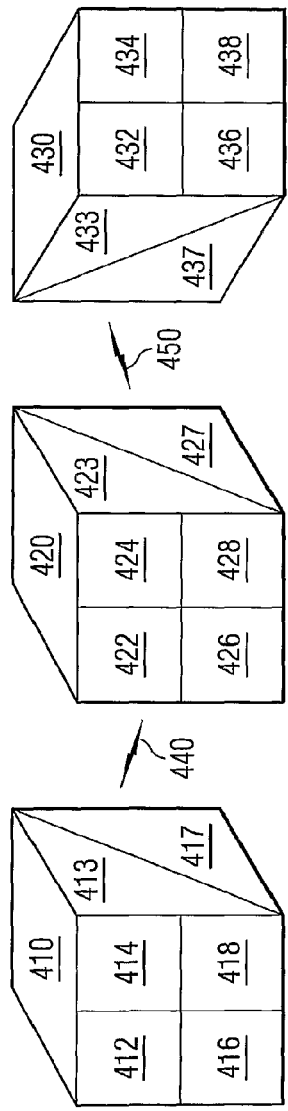
FIG. 4 illustrates a system according to an embodiment of the present invention.

FIG. 4 illustrates a system according to an embodiment of the present invention. The system includes a UE 410, an MME 420, and an MSC 430. As shown in FIG. 4, the UE 410 can be connected to the MME 420 by a connection 440, and the MME 420 can be connected to the MSC 430 by another connection 450. Both connections 440 and 450 are shown as direct wireless connections, though there is no need for them to be either direct or wireless. For example, connection 450 may be an indirect wired connection via multiple network elements, and connection 440 may be an indirect hybrid connection that is wired in part and wireless for the last part of the connection to the UE 410.

Each of UE 410, MME 420, and MSC 430 includes a respective processor (412, 422, and 423), transmitter (414, 424, and 434), memory (416, 426, and 436), and receiver (418, 428, and 438). These functional blocks can be implemented in respective hardware (413, 423, and 433) and software (417, 427, and 437).

The hardware (413, 423, and 433) can include, for example, a general purpose computer, an Application Specific Integrated Circuit (ASIC), or the like. The hardware (413, 423, and 433) can also include a computer readable medium, such as an electronically programmable read only memory (EPROM), a hard disk, or other optical, electronic, or magnetic storage.

The UE 410, MME 420, and MSC 430 can be configured to perform the various methods of various embodiments of the present invention, such as the methods discussed in FIG. 5, below.

Figure 5:
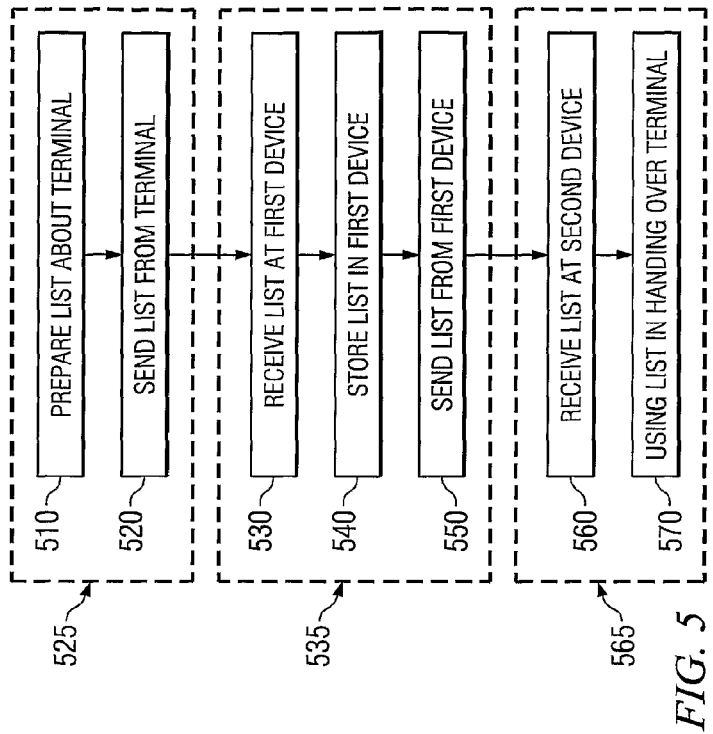
FIG. 5 illustrates a method according to an embodiment of the present invention.

FIG. 5 illustrates a method according to an embodiment of the present invention. As illustrated in a FIG. 5, a method can include preparing 510 a list of circuit switched capabilities of a terminal device. The method can also include sending 520 the list to a network device during attachment, receiving 530 the list at the network device, storing 540 the list in the network device, sending 550 the list to a second network device, receiving 560 the list at the second network device, and using 570 the list in handing over the terminal device to the second network device.

The method can be divided into three main stages, which can be performed in separate devices. For example, stage 525 can be performed in a user equipment. Stage 535 can be performed in a mobility management entity. Stage 565, similarly, can be performed in a mobile switching center. The list can be a codec list of codecs supported by the user equipment.

Each stage can be performed by a computer device, such as a general purpose computer or a special purpose computing device. The stage can be implemented as a computer program product, or as a computer program embodied on a computer-readable medium, such as digital magnetic or optical storage.

An example of a codec list according to embodiment of the present invention follows, in which the ordering may simply be according to an organizational preference, and not according to any particular priority:

1. AMR FR, mode=CH0
2. AMR FR, mode=CH1
3. AMR FR, mode=CHx.
. . .
4. AMR HR, mode=CH8
5. AMR HR, mode=CHx.
. . .
X. EFR
Y. EVRC
Z. New future codec
. . .

Thus, the list may be comprehensive and expandable. As noted above, the list may be implemented as a bitmap, such that for each supported codec, the bitmap is encoded with a "1" and for each unsupported codec, the bitmap is encoded with a "0," or vice versa.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

A method can include preparing a list of circuit switched capabilities of a terminal device and sending the list to a network device during attachment.

The terminal device can be a user equipment. The network device can be a mobility management entity. The list can be a codec list of codecs supported by the terminal device. The method can be implemented via a computer program embodied on a computer-readable medium.

Another method can include receiving a list of circuit switched capabilities of a terminal device during attachment and storing the list in a network device during attachment. The method can further include providing the list to a second network device during handover.

The terminal device can be a user equipment. The network device can be a mobility management entity. The second network device can be a mobile switching center. The list can be a codec list of codecs supported by the terminal device. The method can be implemented via a computer program embodied on a computer-readable medium.

A further method can include receiving a list of circuit switched capabilities of a terminal device during attachment and using the list to properly hand over the terminal device to a network device.

The terminal device can be a user equipment. The network device can be a mobile switching center. The list can be received from a mobility management entity. The list can be a codec list of codecs supported by the terminal device. The method can be implemented via a computer program embodied on a computer-readable medium.

An additional method can include preparing a list of include preparing a list of circuit switched capabilities of a terminal device, sending the list to a network device during attachment, receiving the list at the network device, storing the list in the network device, sending the list to a second network device, receiving the list at the second network device, and using the list in handing over the terminal device to the second network device.

The terminal device can be a user equipment. The network device can be a mobility management entity. The second network device can be a mobile switching center. The list can be a codec list of codecs supported by the terminal device. The method can be implemented via a computer program embodied on a computer-readable medium.

An apparatus can include a processor configured to prepare a list of circuit switched capabilities of a terminal device and a transmitter configured to send the list to a network device during attachment.

The terminal device can be a user equipment. The network device can be a mobility management entity. The list can be a codec list of codecs supported by the terminal device. The apparatus can be implemented as a single chip in the terminal device.

Another apparatus can include a receiver configured to receive a list of circuit switched capabilities of a terminal device during attachment and a memory configured to store the list in a network device. The apparatus can further include a transmitter configured to provide the list to a second network device during handover.

The terminal device can be a user equipment. The network device can be a mobility management entity. The second network device can be a mobile switching center. The list can be a codec list of codecs supported by the terminal device. The apparatus can be implemented as a single chip in the mobility management entity.

A further apparatus can include a receiver configured to receive a list of circuit switched capabilities of a terminal device during attachment and a processor configured to use the list to properly hand over the terminal device to a network device.

The terminal device can be a user equipment. The network device can be a mobile switching center. The list can be received from a mobility management entity. The list can be a codec list of codecs supported by the terminal device. The apparatus can be implemented as a single chip in a mobile switching center.

A system can include a terminal device configured to prepare a list of circuit switched capabilities of the terminal device and to send the list to a network device during attachment. The system can also include the first network device configured to receive the list, configured to store the list in the network device, and configured to send the list to a second network device. The system can further include the second network device configured to receive the list and to use the list in handing over the terminal device to the second network device.

The list can be a codec list of codecs supported by the terminal device. The system can be implemented as a network of telecommunication devices.

An apparatus can include preparing means for preparing a list of circuit switched capabilities of a terminal device and sending means for sending the list to a network device during attachment.

The terminal device can be a user equipment. The network device can be a mobility management entity. The list can be a codec list of codecs supported by the terminal device. The apparatus can be implemented as a single chip in the terminal device.

Another apparatus can include a receiving means for receiving a list of circuit switched capabilities of a terminal device during attachment and storage means for storing the list in a network device. The apparatus can further include sending means for providing the list to a second network device during handover.

The terminal device can be a user equipment. The network device can be a mobility management entity. The second network device can be a mobile switching center. The list can be a codec list of codecs supported by the terminal device. The apparatus can be implemented as a single chip in the mobility management entity.

A further apparatus can include receiving means for receiving a list of circuit switched capabilities of a terminal device during attachment and a handover means for using the list to properly hand over the terminal device to a network device.

The terminal device can be a user equipment. The network device can be a mobile switching center. The list can be received from a mobility management entity. The list can be a codec list of codecs supported by the terminal device. The apparatus can be implemented as a single chip in a mobile switching center.

A system can include terminal means for preparing a list of circuit switched capabilities of the terminal device and sending the list to first network means. The system can also include the first network means for receiving the list, storing the list, and sending the list to a second network means. The system can further include the second network means for receiving the list and using the list in handing over the terminal device to the second network device.

The list can be a codec list of codecs supported by the terminal device. The system can be implemented as a network of telecommunication devices.

We claim:

1. An apparatus, comprising:
   a processor configured to prepare a list of circuit switched capabilities of the apparatus; and
   a transmitter configured to cause the list to be sent, from the apparatus, toward a network device during an attachment procedure,
   wherein the transmitter is configured to send the list during the attachment procedure of the apparatus to a cellular network operator coordinated packet-switched only network.

2. The apparatus according to claim 1, wherein the apparatus comprises a mobile terminal device.

3. The apparatus according to claim 1, wherein the list comprises a codec list of codecs supported by the apparatus.

4. The apparatus according to claim 1, wherein the apparatus is implemented as a single chip in a mobile terminal device.

5. The apparatus according to claim 1, wherein:
   the attachment procedure comprises a long term evolution (LTE) attachment procedure,
   the terminal device comprises a user equipment,
   the list of circuit-switched capabilities comprises a codec list of codecs supported by the user equipment, and
   the transmitter being configured to send the list to the network device comprises the transmitter being configured to send the list to an eNodeB.

6. A method, comprising:
   preparing, by an apparatus, a list of circuit switched capabilities of the apparatus; and
   transmitting the list, from the apparatus, toward a network device during an attachment procedure,
   wherein the transmitting comprises transmitting the list during the attachment procedure of the apparatus to a cellular network operator coordinated packet-switched only network.

7. The method according to claim 6, wherein the apparatus comprises a mobile terminal device.

8. The method according to claim 6, wherein the list comprises a codec list of codecs supported by the apparatus.

9. The method according to claim 6, wherein the apparatus is implemented as a single chip in a mobile terminal device.

10. The method according to claim 6, wherein:
    the attachment procedure comprises a long term evolution (LTE) attachment procedure,
    the apparatus comprises a user equipment,
    the list of circuit-switched capabilities comprises a codec list of codecs supported by the user equipment, and
    the transmitting comprises transmitting the list to an eNodeB.

11. A computer program, embodied on a non-transitory computer readable medium, the computer program configured to control a processor to execute a process, comprising:
    preparing a list of circuit switched capabilities of an apparatus; and
    transmitting the list toward a network device during an attachment procedure,
    wherein the transmitting comprises transmitting the list during the attachment procedure of the apparatus to a cellular network operator coordinated packet-switched only network.

12. The computer program according to claim 11, wherein the apparatus comprises a mobile terminal device.

13. The computer program according to claim 11, wherein the list comprises a codec list of codecs supported by the apparatus.

14. The computer program according to claim 11, wherein the apparatus is implemented as a single chip in a mobile terminal device.

15. The computer program according to claim 11, wherein:
    the attachment procedure comprises a long term evolution (LTE) attachment procedure,
    the apparatus comprises a user equipment,
    the list of circuit-switched capabilities comprises a codec list of codecs supported by the user equipment, and
    the transmitting comprises transmitting the list to an eNodeB.

* * * * *

UNITED STATES PATENT AND TRADEMARK OFFICE
CERTIFICATE OF CORRECTION

| | | |
|---|---|---|
| PATENT NO. | : 9,014,125 B2 | Page 1 of 1 |
| APPLICATION NO. | : 14/080996 | |
| DATED | : April 21, 2015 | |
| INVENTOR(S) | : Hannu Hietalahti et al. | |

It is certified that error appears in the above-identified patent and that said Letters Patent is hereby corrected as shown below:

In the Claims:

Claim 5, Column 7, Line 49
please change "terminal device" to --apparatus--

Signed and Sealed this
Twenty-second Day of December, 2015

Michelle K. Lee
*Director of the United States Patent and Trademark Office*